United States Patent
Tsubooka et al.

(10) Patent No.: US 8,824,545 B2
(45) Date of Patent: Sep. 2, 2014

(54) IMAGE ENCODING DEVICE AND IMAGE ENCODING METHOD

(75) Inventors: Takeo Tsubooka, Yokohama (JP); Miho Ezure, Yokohama (JP)

(73) Assignee: JVC Kenwood Corporation, Yokohama-shi (JP)

( * ) Notice: Subject to any disclaimer, the term of this patent is extended or adjusted under 35 U.S.C. 154(b) by 369 days.

(21) Appl. No.: 13/260,025

(22) PCT Filed: Jul. 23, 2010

(86) PCT No.: PCT/JP2010/004727
§ 371 (c)(1),
(2), (4) Date: Sep. 23, 2011

(87) PCT Pub. No.: WO2011/043013
PCT Pub. Date: Apr. 14, 2011

(65) Prior Publication Data
US 2012/0014430 A1    Jan. 19, 2012

(30) Foreign Application Priority Data
Oct. 9, 2009   (JP) ................................ 2009-235060

(51) Int. Cl.
| | |
|---|---|
| *H04N 11/02* | (2006.01) |
| *H04N 7/26* | (2006.01) |
| *H04N 7/50* | (2006.01) |
| *H04N 7/36* | (2006.01) |

(52) U.S. Cl.
CPC ..... *H04N 19/0023* (2013.01); *H40N 19/00266* (2013.01); *H04N 19/00781* (2013.01); *H04N 19/00721* (2013.01); *H04N 19/00018* (2013.01)

USPC ............ 375/240.01; 375/240.12; 375/240.15; 348/394.1; 382/238

(58) Field of Classification Search
USPC ........................................ 375/240.01–240.29
See application file for complete search history.

(56) References Cited

U.S. PATENT DOCUMENTS 6,801,707 B1    10/2004   Harumoto et al.
7,257,158 B1 *   8/2007   Figueredo et al. ....... 375/240.01
(Continued)

FOREIGN PATENT DOCUMENTS

| CN | 1246244 A | 3/2000 |
| CN | 1643608 A | 7/2005 |

(Continued)

OTHER PUBLICATIONS

Office Action in European Patent Application No. 10821691.2, dated Nov. 21, 2013.

(Continued)

*Primary Examiner* — Sath V Perungavoor
*Assistant Examiner* — Nathnael Aynalem
(74) *Attorney, Agent, or Firm* — Venable LLP; Michael A. Sartori; George L. Howarah

(57) ABSTRACT

An image encoding device has: a first acquisition unit and a second acquisition unit that acquire a moving image; an encoding unit that encodes the acquired moving image in accordance with a predetermined encoding order and a predetermined encoding method; and a reception unit that receives an instruction to stop performing a process. When the reception unit receives the instruction, the encoding unit uses a last acquired image as an image that was to be acquired after the last acquired image and encodes all acquired images.

4 Claims, 7 Drawing Sheets

(56) References Cited

U.S. PATENT DOCUMENTS

| | | |
|---|---|---|
| 2001/0005451 A1 | 6/2001 | Obara |
| 2004/0258394 A1 | 12/2004 | Harumoto et al. |
| 2004/0258395 A1 | 12/2004 | Harumoto et al. |
| 2004/0264925 A1 | 12/2004 | Harumoto et al. |
| 2006/0115234 A1* | 6/2006 | Kim et al. .................. 386/68 |
| 2008/0131009 A1* | 6/2008 | Tsuchida et al. ............ 382/234 |

FOREIGN PATENT DOCUMENTS

| | | |
|---|---|---|
| CN | 1756360 A | 4/2006 |
| EP | 0 982 952 A2 | 3/2000 |
| EP | 1 065 665 A1 | 1/2001 |
| EP | 1 085 767 A2 | 3/2001 |
| JP | 2001-160968 A | 6/2001 |
| JP | 2001-186469 A | 7/2001 |
| JP | 2003-199021 A | 7/2003 |
| WO | WO-01/39502 A1 | 5/2001 |
| WO | WO-2006/012496 A2 | 2/2006 |

OTHER PUBLICATIONS

Extended European Search Report in European Patent Application No. 10821691.2 dated Mar. 26, 2013.

Office Action in Chinese Patent Application No. 201080003191.7 dated Jan. 4, 2013.

* cited by examiner

IMAGE ENCODING DEVICE AND IMAGE ENCODING METHOD

TECHNICAL FIELD

The present invention relates to techniques for encoding moving images.

BACKGROUND ART

In moving image encoding using, for example, MPEG-2, MPEG-4, and MPEG-4 AVC, a method called bi-directional prediction or bi-predictive prediction is used to efficiently reduce the encoding amount.

FIG. 1 is a diagram explaining a flow of code data. In the example shown in FIG. 1, fields B0$t$, B0$b$, B1$t$, B1$b$, B3$t$, B3$b$, B4$t$, B4$b$, B6$t$, B6$b$, B7$t$, and B7$b$ are B pictures. A field I2$t$ is an I picture, and fields P2$b$, P5$t$, P5$b$, P8$t$, and P8$b$ are P pictures. The symbol "t" indicates that a field to which the symbol is assigned is a top field, and the symbol "b" indicates that a field to which the symbol is assigned is a bottom field.

An image encoding device sequentially acquires images shown in FIG. 1(A). As shown in FIG. 1(B), the image encoding device then skips the B picture frames and encodes the I picture and then the P picture so as to encode the B pictures that require both previous and forward encoded pictures at the end.

[Patent document No. 1] Japanese Patent Application Laid-open 2001-186469

DISCLOSURE OF THE INVENTION

Problem to be Solved by the Invention

In a conventional image encoding device, if an image obtained at the end is to be a B picture when an instruction to stop a process is provided, the image obtained at the end cannot be encoded since an image that is subsequently obtained is necessary for the encoding of a B picture. In other words, there are occasions when a conventional image encoding device cannot encode all the obtained images.

A purpose of the present invention is to provide an image encoding device and an image encoding method that allow for the encoding of all obtained images.

Means for Solving the Problem

The image encoding device according to the present invention comprises: an acquisition unit configured to acquire a moving image; an encoding unit configured to encode the moving image, which is acquired by the acquisition unit, in accordance with a predetermined encoding order and a predetermined encoding method; and a reception unit configured to receive an instruction to stop performing a process, wherein the encoding unit encodes, when the reception unit receives the instruction, all images acquired by the acquisition unit using a last acquired image or an image acquired before the last acquired image by the acquisition unit as an image that was to be acquired after the last acquired image.

The image encoding method according to the present invention comprises: acquiring a moving image; and encoding the acquired moving image in accordance with a predetermined encoding order and a predetermined encoding method, wherein, in the encoding, when an instruction to stop performing a process is received, a last acquired image or an image acquired before the last acquired image is used as an image that was to be acquired after the last acquired image so that all acquired images are encoded.

Advantageous Effects

According to the present invention, an image encoding device and an image encoding method can be provided that allow for the encoding of all obtained images.

BEST MODE FOR CARRYING OUT THE INVENTION

A description will now be given of the embodiments of the present invention in reference to the figures.

First Embodiment

Figure 1A:
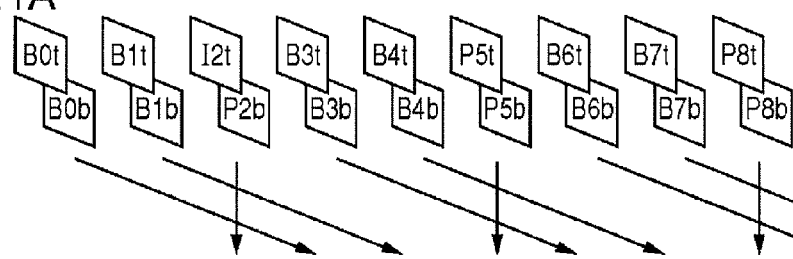
FIG. 1 is a diagram illustrating general encoding of moving images.
Figure 1B:
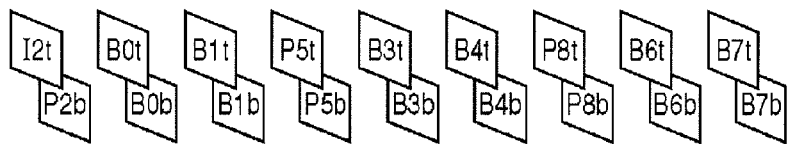
Figure 2:
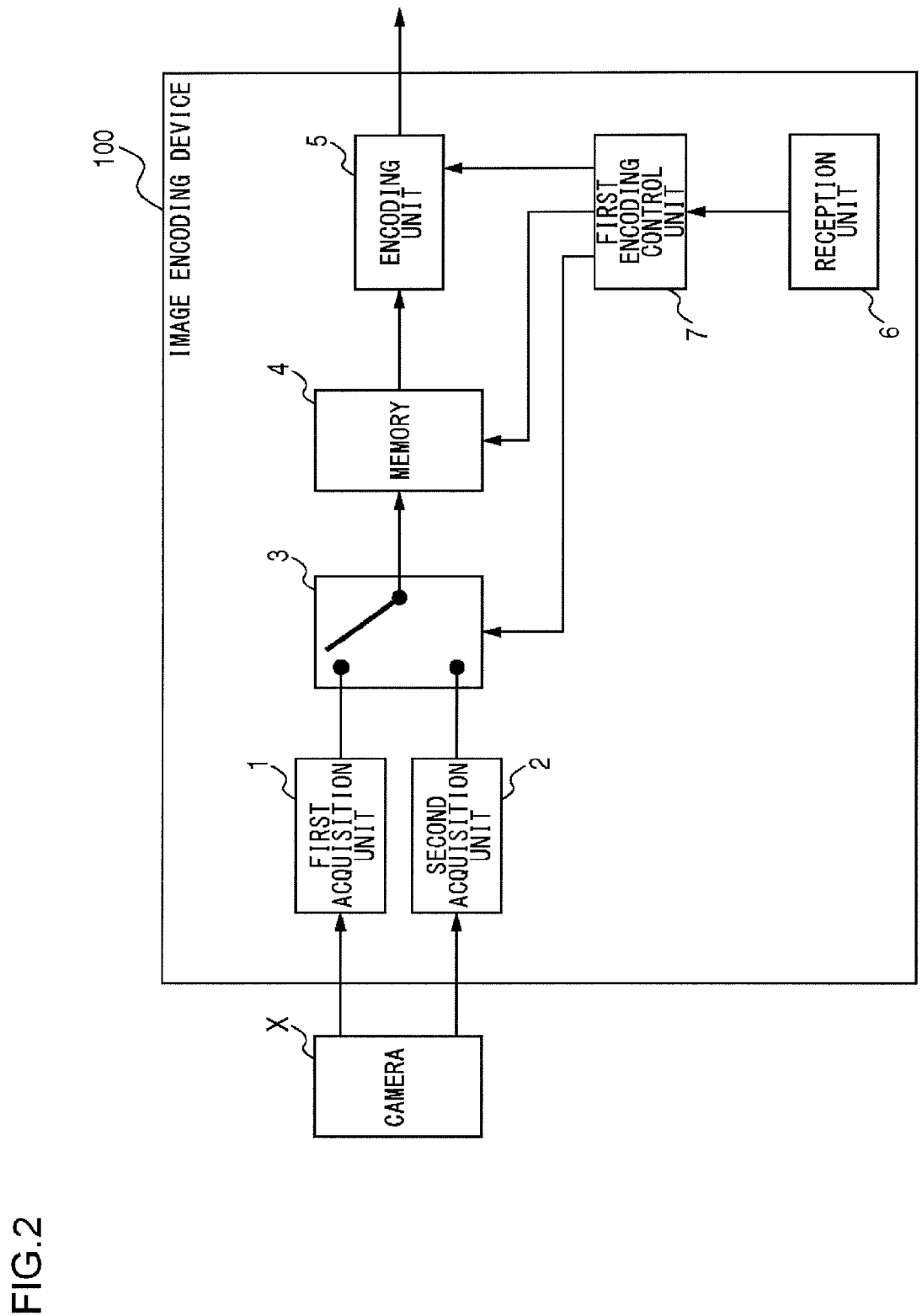
FIG. 2 is a diagram illustrating the configuration of an image encoding device according to a first embodiment.

A description is first given of the configuration of an image encoding device 100 according to a first embodiment in reference to FIG. 2. FIG. 2 is a diagram illustrating the configuration of the image encoding device 100 according to the first embodiment. As shown in FIG. 2, the image encoding device 100 according to the first embodiment has a first acquisition unit 1, a second acquisition unit 2, a switch unit 3, memory 4, an encoding unit 5, a reception unit 6, and a first encoding control unit 7.

The first acquisition unit 1 intermittently acquires from a camera X a moving image of one frame comprising a top field and a bottom field at a preset interval. For example, the first acquisition unit 1 intermittently acquires a moving image of one frame every one minute. The second acquisition unit 2 sequentially acquires a moving image from the camera x in units of fields. The switch unit 3 switches an image, which is to be output to the subsequent memory 4, between an image from the first acquisition unit 1 and an image from the second acquisition unit 2.

The memory 4 temporarily stores the image from the switch unit 3. The encoding unit 5 encodes the image stored in the memory 4 in units of fields and generates an encoded stream. The reception unit 6 receives an instruction to start or stop the intermittent encoding of an image. The first encoding control unit 7 controls the operations of the switch unit 3, the memory 4, and the encoding unit 5 based on an instruction received by the reception unit 6.

In the first embodiment, the structure of the group of pictures (GOP) of the encoded stream generated by the encoding unit 5 is "M3N9".

A description is now given of the operation of the image encoding device 100 according to the first embodiment.

When the reception unit 6 receives an instruction to start intermittent encoding of an image, the first encoding control unit 7 controls the switch unit 3 so that a moving image acquired by the first acquisition unit 1 is input to the memory 4. As described above, the first acquisition unit 1 intermittently acquires, from the camera X, a moving image of one frame comprising a top field and a bottom field at a predetermined interval. The memory 4 sequentially and temporarily stores the input image.

The first encoding control unit 7 controls the order in which the memory 4 outputs images so that the encoding is carried out in a predetermined encoding order. The memory 4 outputs the temporarily-stored image to the encoding unit 5 in accordance with the control by the first encoding control unit 7. The encoding unit 5 encodes the image from the memory 4 in accordance with an encoding method based on the above encoding order and generates an encoded stream.

Then, when the reception unit 6 receives an instruction to stop the intermittent encoding of the image, the first encoding control unit 7 controls the switch unit 3 so that the moving image of one frame, which is acquired immediately after the instruction is received by the second acquisition unit 2, is input to the memory 4. The memory 4 temporarily stores the input image of one frame.

The first encoding control unit 7 determines after the acquisition of which picture of the GOP the reception unit 6 received the instruction to stop the intermittent encoding of the image. Based on the determination result, the first encoding control unit 7 then controls the encoding unit 5 such that all the acquired images are encoded and such that the encoding is ensured to be carried out until the GOP including a last acquired image is completed.

The encoding unit 5 performs encoding using once or repeatedly for multiple times the last acquired image until the GOP including the image acquired at the end is completed. The encoding unit 5 finishes encoding upon the completion of encoding the last acquired image.

An explanation is given in the following by using specific examples shown in FIGS. 3-5 regarding the operation of the image encoding device 100 according to the first embodiment.

Figure 3A:
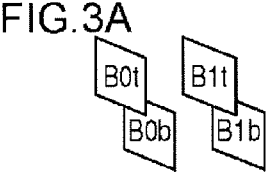
FIG. 3 is a first diagram specifically illustrating the operation of the image encoding device according to the first embodiment.

FIG. 3 is a first diagram specifically illustrating the operation of the image encoding device 100 according to the first embodiment. FIG. 3(A) illustrates images acquired by the image encoding device 100 in a first specific example and shows that a frame B1 (B1t, B1b) follows a frame B0 (B0t, B0b) as images to be acquired. In this situation, it is assumed that the reception unit 6 receives an instruction to stop the intermittent encoding of an image after the frame B0 is acquired by the image encoding device 100 and before the frame B1 is acquired.

Figure 3B:
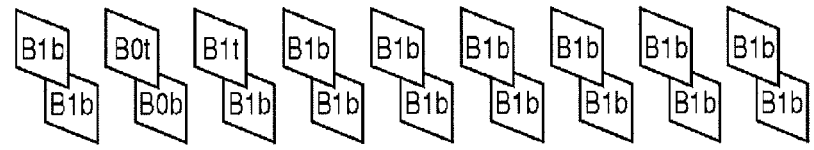

In this case, the first encoding control unit 7 controls the switch unit 3, the memory 4, and the encoding unit 5 so that the frame B1 is stored in the memory 4 as the last image and so that the encoding is performed by using all the images including the frame B1 until the GOP including the frame B1 is completed. In other words, as shown in FIG. 3(B), the first encoding control unit 7 inputs a frame B1, a frame B0, a frame B1, a frame B1, . . . to the encoding unit 5 until the GOP including a frame B1 is completed. FIG. 3(B) is a diagram illustrating the images to be input to the encoding unit 5.

Figure 3C:
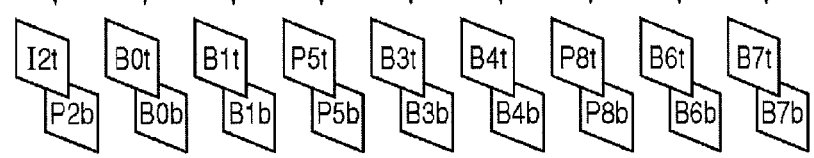

As shown in FIG. 3(C), the encoding unit 5 determines a bottom field B1b, which is acquired at the end, to be an image to be used as an original image of a top field and a bottom field of an I2 frame, in accordance with the predetermined encoding order. The encoding unit 5 performs encoding to be performed on an I picture on the bottom field B1b, which is used as the top field of the I2 frame. The encoding unit 5 performs encoding to be performed on a P picture on the bottom field B1b, which is used as the bottom field of the I2 frame. FIG. 3(C) is a diagram illustrating encoded data.

The encoding unit 5 then encodes the acquired frames B0 and B1. In other words, the encoding unit 5 performs encoding to be performed on a B picture on the respective fields that constitute the frame B0 and the frame B1 in the said order. Further, as shown in FIGS. 3(B) and 3(C), the encoding unit 5 performs encoding in accordance with an encoding method based on the predetermined encoding order while repeatedly using the last acquired bottom field B1b as the original image of an image to be encoded until the GOP is completed.

Figure 4A:
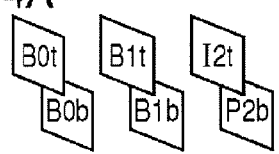
FIG. 4 is a second diagram specifically illustrating the operation of the image encoding device according to the first embodiment.

FIG. 4 is a second diagram specifically illustrating the operation of the image encoding device 100 according to the first embodiment. FIG. 4(A) is a diagram illustrating the images acquired by the image encoding device 100 in a second specific example. In other words, FIG. 4(A) shows, as images to be acquired, a frame B0 (B0t, B0b) followed by a frame B1 (B1t, B1b), which is further followed by a frame I2 (I2t, P2b). In this situation, it is assumed that the reception unit 6 receives an instruction to stop the intermittent encoding of an image is acquired after the frame B1 is acquired by the image encoding device 100 and before the frame I2.

Figure 4B:
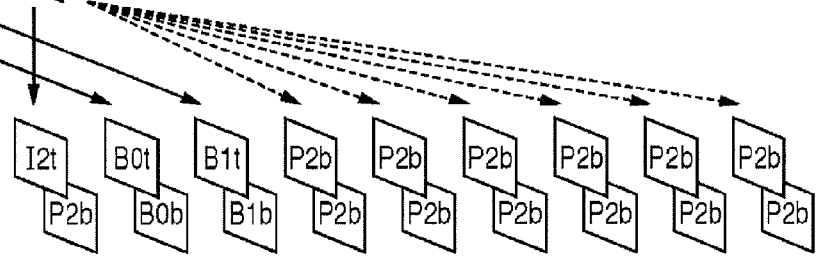

In this case, the first encoding control unit 7 controls the switch unit 3, the memory 4, and the encoding unit 5 so that the frame I2 is stored in the memory 4 as the last image and so that the encoding is performed by using all the images including the frame I2. In other words, as shown in FIG. 4(B), the first encoding control unit 7 inputs a frame I2, a frame B0, a frame B1, a frame I2, a frame I2, . . . to the encoding unit 5 until the GOP including the frame I2 is completed. FIG. 4(B) is a diagram illustrating the images to be input to the encoding unit 5.

Figure 4C:
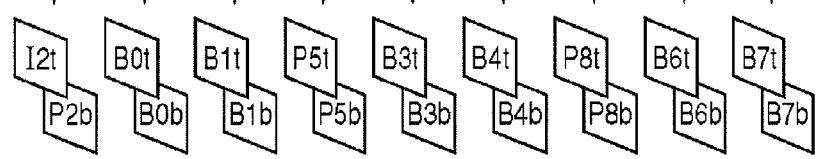

As shown in FIG. 4(C), the encoding unit 5 encodes, in accordance with the predetermined encoding order, the frame I2, the frame B0, and the frame B1 in the said order. FIG. 4(C) is a diagram illustrating encoded data.

Further, as shown in FIGS. 4(B) and 4(C), the encoding unit 5 performs encoding in accordance with an encoding method based on the predetermined encoding order while repeatedly using the last acquired bottom field P2b as the original image of an image to be encoded until the GOP is completed.

Figure 5A:
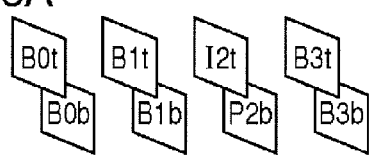
FIG. 5 is a third diagram specifically illustrating the operation of the image encoding device according to the first embodiment.

FIG. 5 is a third diagram specifically illustrating the operation of the image encoding device 100 according to the first embodiment. FIG. 5(A) is a diagram illustrating the images acquired by the image encoding device 100 in a third specific example. In other words, FIG. 5(A) shows, as images to be acquired, a frame B0 (B0t, B0b) followed by a frame B1 (B1t, B1b), which is further followed by a frame I2 (I2t, P2b), which is further followed by a frame B3 (B3t, B3b). In this situation, it is assumed that the reception unit 6 receives an instruction to stop the intermittent encoding of an image after the frame I2 is acquired by the image encoding device 100 and before the frame B3 is acquired.

In this case, the first encoding control unit 7 controls the switch unit 3, the memory 4, and the encoding unit 5 so that the frame B3 is stored in the memory 4 as the last image and so that the encoding is performed by using all the images including the frame B3. In other words, as shown in FIG.

Figure 5B:
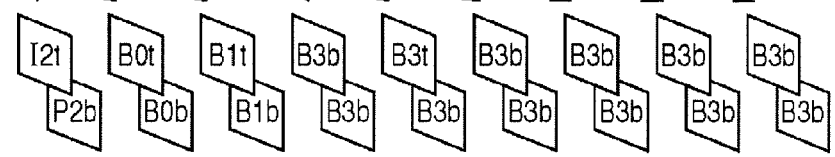

5(B), the first encoding control unit 7 inputs a frame I2, a frame B0, a frame B1, a frame B3, a frame B3, ... to the encoding unit 5 until the GOP including the frame B3 is completed. FIG. 5(B) is a diagram illustrating the images to be input to the encoding unit 5.

Figure 5C:
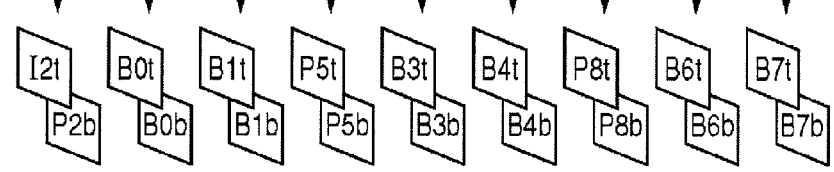

As shown in FIG. 5(C), the encoding unit 5 encodes, in accordance with the predetermined encoding order, the frame I2, the frame B0, and the frame B1 in the said order. FIG. 5(C) is a diagram illustrating encoded data. Based on the predetermined encoding order, the encoding of the frame B3 requires a frame P5, which was to be acquired after the frame B3. However, the image encoding device 100 has not acquired the frame P5.

As shown in FIGS. 5(B) and 5(C), the encoding unit 5 determines a bottom field B3$b$, which is acquired at the end, to be an image to be used as an original image of a top field and a bottom field of a P5 frame in accordance with the predetermined encoding order. The encoding unit 5 performs encoding to be performed on a P picture on the bottom field B3$b$, which is used as the top field of the P5 frame. The encoding unit 5 performs encoding to be performed on a P picture on the bottom field B3$b$, which is used as the bottom field of the P5 frame.

The encoding unit 5 then encodes the last acquired frame B3. In other words, the encoding unit 5 performs encoding to be performed on a B picture on a field B3$t$ and a field B3$b$ in the said order. Further, as shown in FIGS. 5(B) and 5(C), the encoding unit 5 performs encoding in accordance with an encoding method based on the predetermined encoding order while repeatedly using the last acquired bottom field B3$b$ as the original image of an image to be encoded until the GOP is completed.

As described above, the encoding unit 5 uses a last acquired image as an image that was to be acquired after the image and encodes all acquired images. This allows a situation to be prevented where a last acquired image cannot be encoded. This also provides an advantage, in reproducing an image that follows the last acquired image, of reproducing the image without a hint of contrivance.

The encoding unit 5 may use an image acquired before the last acquired image, instead of using the last acquired image, as an image that was to be acquired after the last acquired image. For example, the encoding unit 5 may use an image acquired immediately before the last acquired image as an image that was to be acquired after the last acquired image.

In the above-stated first embodiment, the encoding unit 5 performs encoding until the GOP including the last acquired image is completed. This allows a generated encoded stream to be easily edited.

The encoding unit 5 may perform encoding faster than before after the reception unit 6 receives the instruction to stop the intermittent encoding of an image. This allows an encoded stream to be generated at a faster speed compared to the speed of an encoded stream generated when the intermittent encoding was performed.

In the above-stated first embodiment, the structure of the GOP is "M3N9". However, the structure of the GOP may be other than "M3N9". The structure of the GOP may be, for example, "M3N15", "M3N12", or "M2N12". The encoding unit 5 performs encoding using, once or repeatedly for multiple times, a last acquired field in accordance with the number of M and the number of N.

Further, an encoded stream generated by the image encoding device 100 of the first embodiment is transmitted to a decoding device through a transmission path after being converted into a format for transmission and decoded by the decoding device. Alternatively, an encoded stream generated by the image encoding device 100 of the first embodiment is recorded in a recording medium after being converted into a format for recording and later decoded by a decoding device.

Second Embodiment

Figure 6:
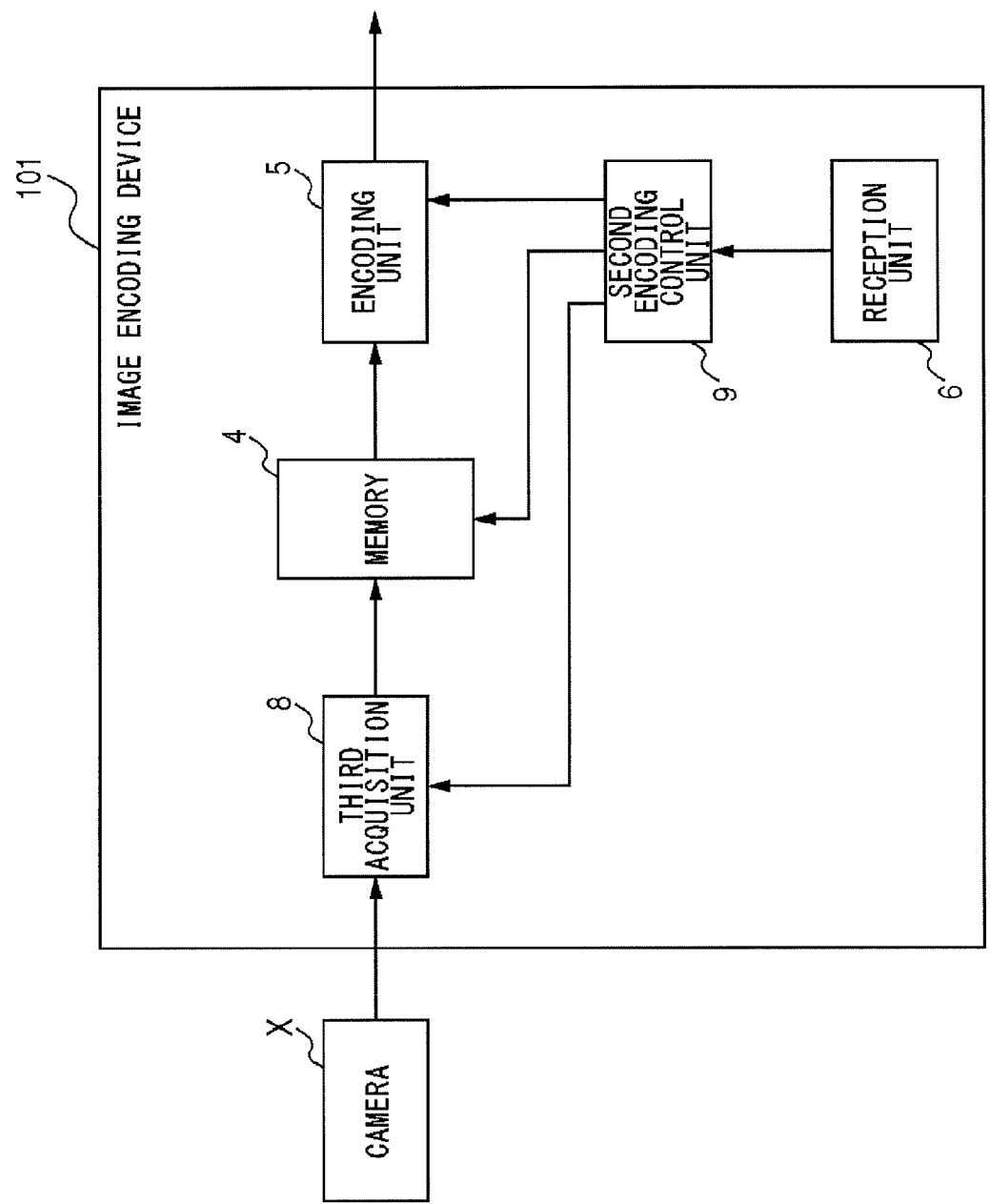
FIG. 6 is a diagram illustrating the configuration of an image encoding device according to a second embodiment.

A description is now given of the configuration of an image encoding device 101 according to a second embodiment in reference to FIG. 6. FIG. 6 is a diagram illustrating the configuration of the image encoding device 101 according to the second embodiment. As shown in FIG. 6, the image encoding device 101 according to the second embodiment has a third acquisition unit 8, memory 4, an encoding unit 5, a reception unit 6, and a second encoding control unit 9. The image encoding device 101 of the second embodiment has the same components as those of the image encoding device 100 of the first embodiment. Thus, an explanation is given in the second embodiment regarding differences from the first embodiment.

Just like the first acquisition unit 1 and the second acquisition unit 2 of the first embodiment, the third acquisition unit 8 acquires a moving image from the camera X in units of fields in accordance with the control by the second encoding control unit 9. The third acquisition unit 8 acquires a moving image of one frame in a single acquisition operation. The third acquisition unit 8 has: a function of intermittently acquiring a moving image of one frame comprising a top field and a bottom field at a predetermined interval; and a function of sequentially acquiring a moving image.

In other words, when the reception unit 6 receives an instruction to start intermittent encoding of an image, the third acquisition unit 8 intermittently acquires a moving image of one frame comprising a top field and a bottom field at a predetermined interval. When the reception unit 6 receives an instruction to stop the intermittent encoding of an image, the third acquisition unit 8 acquires an image of one frame obtained immediately after the reception of the instruction.

When the reception unit 6 receives an instruction to start intermittent encoding of an image, the second encoding control unit 9 controls the third acquisition unit 8 so that the third acquisition unit 8 intermittently acquires a moving image of one frame comprising a top field and a bottom field at a predetermined interval. When the reception unit 6 receives an instruction to stop the intermittent encoding of an image, the second encoding control unit 9 controls the third acquisition unit 8 so that the third acquisition unit 8 acquires an image of one frame obtained immediately after the reception of the instruction.

Just like the first encoding control unit 7 of the first embodiment, the second encoding control unit 9 controls the operations of the memory 4 and the encoding unit 5 based on an instruction received by the reception unit 6.

Third Embodiment

Figure 7:
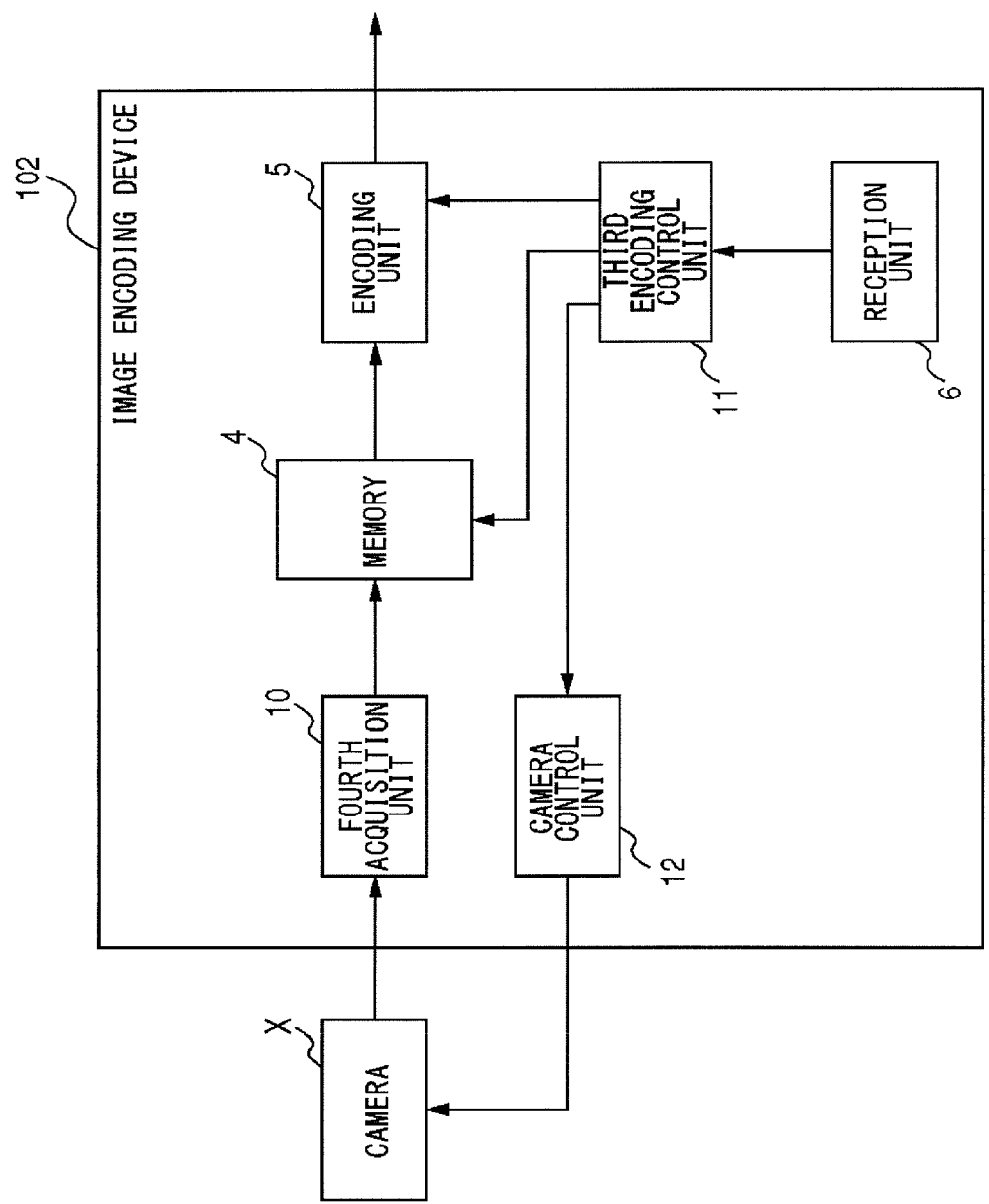
FIG. 7 is a diagram illustrating the configuration of an image encoding device according to a third embodiment.

A description is now given of the configuration of an image encoding device 102 according to a third embodiment in reference to FIG. 7. FIG. 7 is a diagram illustrating the configuration of the image encoding device 102 according to the third embodiment. As shown in FIG. 7, the image encoding device 102 according to the third embodiment has a fourth acquisition unit 10, memory 4, an encoding unit 5, a reception unit 6, a third encoding control unit 11, and a camera control unit 12. The image encoding device 102 of the third embodiment has the same components as those of the image encoding device 100 of the first embodiment. Thus, an explanation is given in the third embodiment regarding differences from the first embodiment.

The fourth acquisition unit 10 acquires all moving images that are output by the camera X. The fourth acquisition unit 10 acquires a moving image of one frame comprising a top field and a bottom field in a single acquisition operation. The fourth acquisition unit 10 is not controlled by the third encoding control unit 11.

When the reception unit 6 receives an instruction to start intermittent encoding of an image, the third encoding control unit 11 controls the camera control unit 12 so that the camera X intermittently outputs a moving image at a predetermined interval. When the reception unit 6 receives an instruction to stop the intermittent encoding of an image, the third encoding control unit 11 controls the camera control unit 12 so that the camera X outputs an image of one frame obtained immediately after the reception of the instruction.

When the reception unit 6 receives an instruction to start intermittent encoding of an image, the camera control unit 12 controls the camera X in accordance with the control by the third encoding control unit 11 so that the camera X intermittently outputs a moving image at a predetermined interval. When the reception unit 6 receives an instruction to stop the intermittent encoding of an image, the camera control unit 12 controls the camera X so that the camera X outputs an image of one frame obtained immediately after the reception of the instruction.

The camera X changes, in accordance with the control by the camera control unit 12, the interval between images to be output. In other words, the camera X intermittently outputs a moving image to the image encoding device 102 at a predetermined interval when the reception unit 6 receives an instruction to start the intermittent encoding of an image, and the camera X outputs an image of one frame obtained immediately after the reception of the instruction when the reception unit 6 receives an instruction to stop the intermittent encoding of an image.

Just like the first encoding control unit 7 of the first embodiment, the third encoding control unit 11 controls the operations of the memory 4 and the encoding unit 5 based on an instruction received by the reception unit 6.

The function of each component of an image encoding device according to an embodiment of the present invention is implemented by the cooperation of, for example, hardware of a computer [e.g., a CPU (processor) and memory] and a computer program for implementing the function. However, the function may be implemented in any embodiment, for example, may be implemented by a special circuit. The computer program for implementing the function of each component of an image encoding device according to an embodiment of the present invention may be stored in a recording medium.

EXPLANATION OF REFERENCE NUMERALS 100 image encoding device
1 first acquisition unit
2 second acquisition unit
3 switch unit
4 memory
5 encoding unit
6 reception unit
7 first encoding control unit

INDUSTRIAL APPLICABILITY

The present invention is applicable in a field related to the encoding of a moving image.

The invention claimed is:

1. An image encoding device comprising:
an acquisition unit configured to acquire frames of a moving image in a first cycle or a second cycle that is longer than the first cycle;
an encoding unit configured to encode the frames of the moving image, which are acquired by the acquisition unit, into groups of pictures (GOP) having a predetermined structure, in accordance with a predetermined encoding order and a predetermined encoding method;
a reception unit configured to receive an instruction to start encoding of frames of the moving image acquired in the second cycle or an instruction to stop the encoding of frames of the moving image acquired in the second cycle; and
an encoding control unit configured to control operation of the acquisition unit and of the encoding unit in response to the instruction to start or stop encoding of frames of the moving image acquired in the second cycle, wherein
after receipt of the instruction to stop the encoding of frames of the moving image acquired in the second cycle, the acquisition unit is controlled to acquire the next frame of the moving image acquired in the first cycle as a last frame to be encoded, and the encoding unit is controlled to encode the acquired frames into a group of pictures having the predetermined structure, in accordance with the predetermined encoding order and the predetermined encoding method by repeatedly using the last frame, until the structure of the group of pictures including the last acquired frame is completed.

2. The image encoding device according to claim 1, wherein
the encoding unit is configured to complete the group of pictures by performing encoding faster than before receipt of the instruction to stop encoding of frames of the moving image acquired in the second cycle.

3. An image encoding method comprising:
acquiring frames of a moving image in a first cycle or a second cycle that is longer than the first cycle;
encoding the acquired frames of the moving image into groups of pictures (GOP) having a predetermined structure in accordance with a predetermined encoding order and a predetermined encoding method;
receiving an instruction to start encoding of frames of the moving image acquired in the second cycle or an instruction to stop the encoding of frames of the moving image acquired in the second cycle; and
controlling the acquiring and the encoding in response to the instruction to start or stop encoding of frames of the moving image acquired in the second cycle, wherein
after receipt of the instruction to stop the encoding of frames of the moving image acquired in the second cycle, acquiring the next frame of the moving image acquired in the first cycle as a last frame to be encoded, and encoding the acquired frames into a group of pictures having the predetermined structure, in accordance with the predetermined encoding order and the predetermined encoding method by repeatedly using the last frame, until the structure of the group of pictures including the last acquired frame is completed.

4. The image encoding method according to claim 3, wherein
in the encoding, the group of pictures is completed by performing encoding faster than before receipt of the instruction to stop encoding of frames of the moving image acquired in the second cycle.

\* \* \* \* \*